Patented Apr. 2, 1940

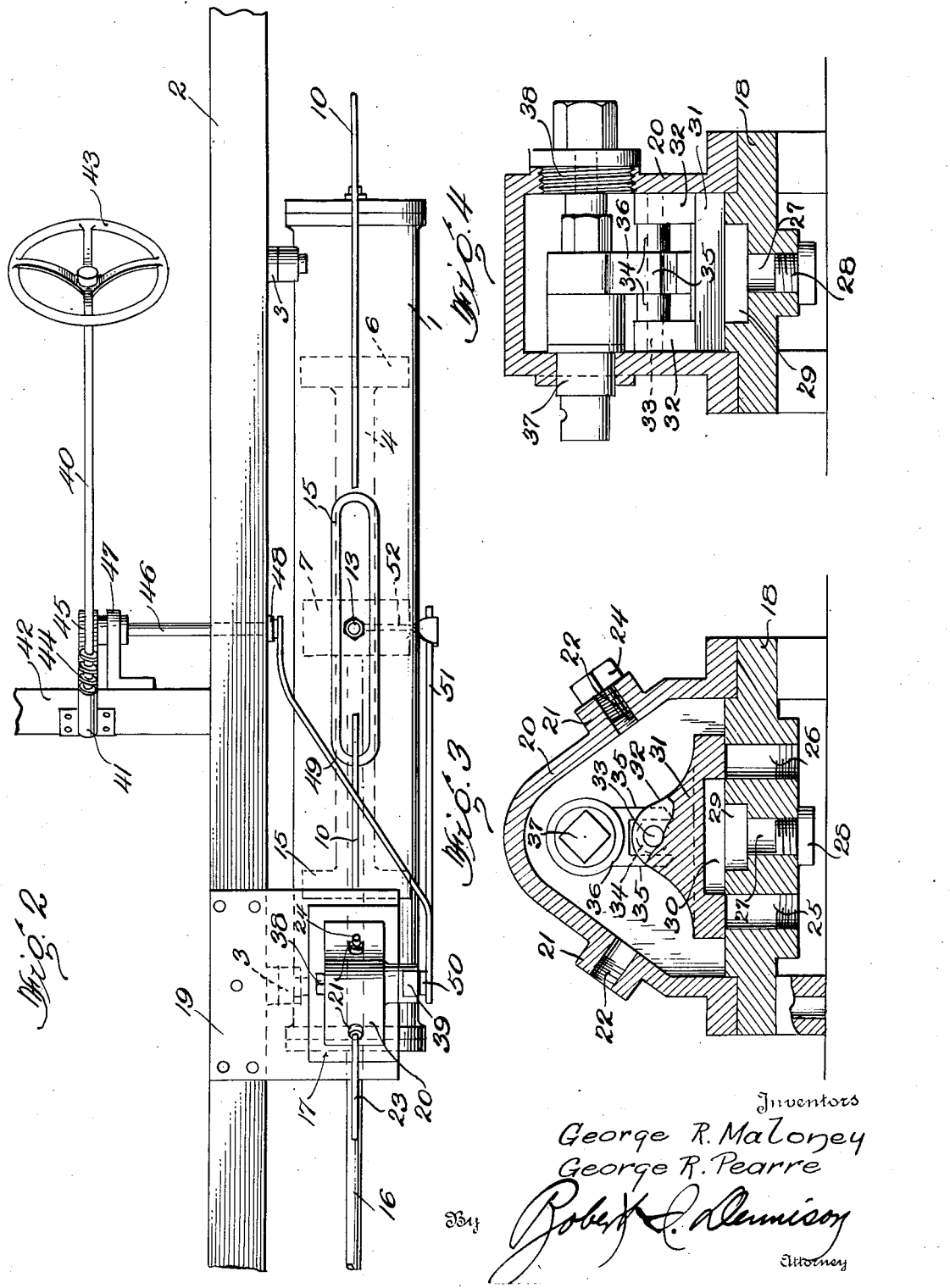

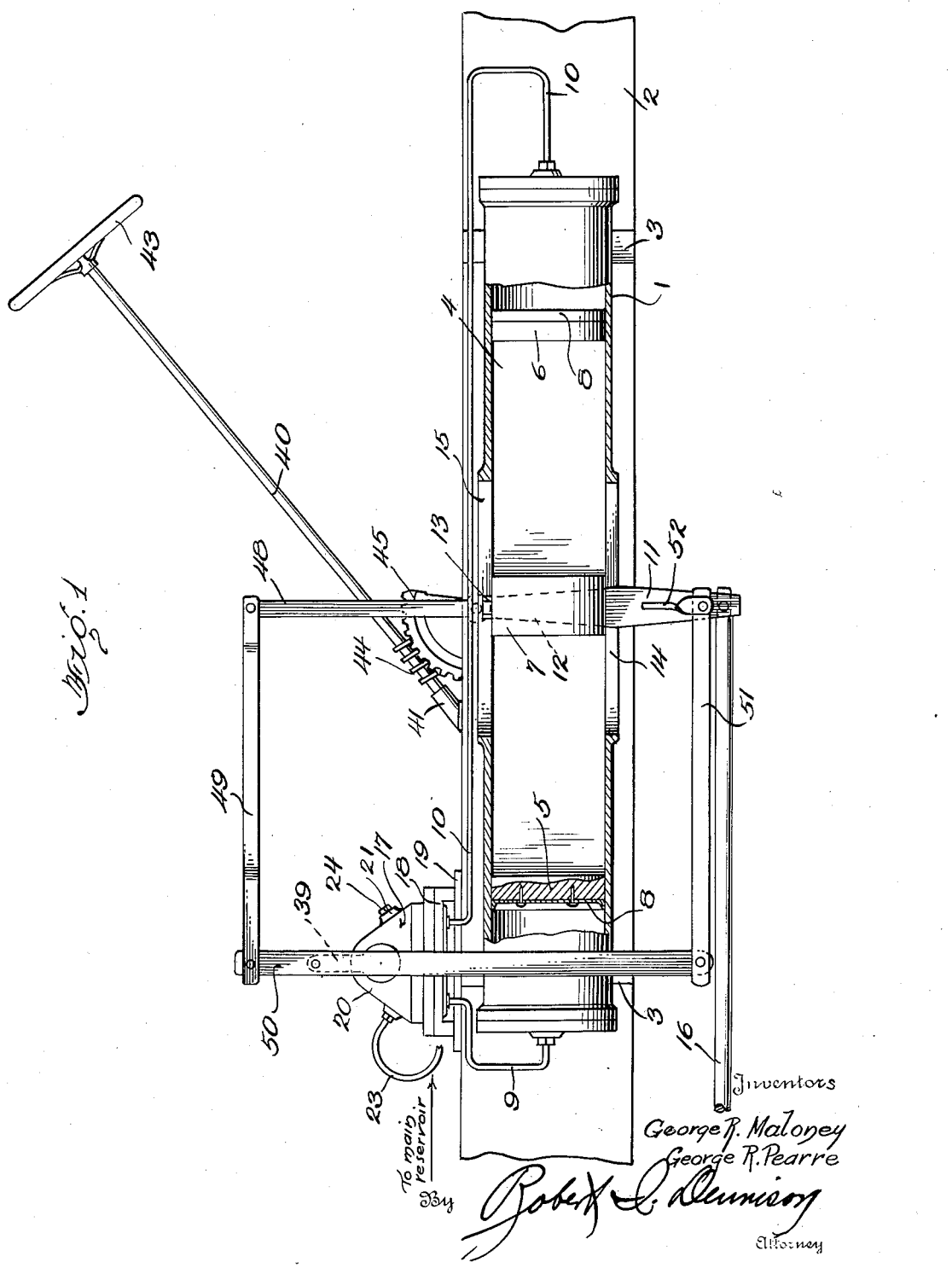

2,195,932

UNITED STATES PATENT OFFICE 2,195,932

PNEUMATIC STEERING GEAR

George R. Maloney and George R. Pearre, Augusta, Ga.

Application August 24, 1939, Serial No. 291,788

5 Claims. (Cl. 180—79.2)

This invention relates to a pneumatic steering gear for automobiles and other motor vehicles and it is one object of the invention to provide a steering gear wherein a piston connected with a drag rod leading from the king pin of the front or rear guiding wheels of the vehicle is slidably mounted on a cylinder to which flow of air under pressure is controlled by a slide valve having improved actuating means for adjusting the valve when the steering shaft of the vehicle is turned toward the right or left for turning the vehicle out of a direct path of travel.

Another object of the invention is to so construct and arrange the actuating means for the slide valve that when the steering shaft is turned, the slide block of the valve will be so moved that the guiding wheels of the vehicle will be turned easily and without jerking motion and restored to a position for directing the vehicle straight ahead after a turn has been made.

Another object of the invention is to provide a pneumatic steering gear wherein movement is transmitted from the steering shaft to the slide block of the valve through the medium of a series of levers and links so arranged that the slide block will be shifted in response to turning of the shaft to the right or left and the piston caused to be so moved in the cylinder that predetermined guiding movement will be imparted to the guiding wheels of the vehicle.

Another object of the invention is to provide a pneumatic steering gear adapted to be mounted at one side of the vehicle chassis in such relation to the steering shaft that it may be conveniently connected with and actuated by the steering shaft.

The invention is illustrated in the accompanying drawings wherein:

Figure 1 is a view showing the improved pneumatic steering gear in side elevation, the cylinder thereof being in longitudinal section.

Figure 2 is a top plan view of the steering gear.

Figure 3 is a vertical sectional view taken longitudinally through the slide valve.

Figure 4 is a transverse sectional view taken vertically through the slide valve.

The cylinder 1 of the pneumatic steering gear extends longitudinally of the vehicle chassis and is mounted outwardly from the chassis bar 2 at the driver's side of the vehicle. Brackets 3 which are secured against the outer side face of the chassis bar 2 are employed as means for mounting the cylinder and holding it firmly in place.

A floating piston 4 is mounted in the cylinder for sliding movement longitudinally therein and has front and rear heads 5 and 6 and an intermediate block 7 midway the length of the piston. Packing cups 8 are carried by the heads 5 and 6 so that the piston will be slid longitudinally in the cylinder when air under pressure is selectively admitted into the cylinder through tubes 9 and 10 leading from front and rear ends of the cylinder. A stem 11 which is secured through an opening 12 formed vertically through the block 7 of the piston by a nut 13 projects downwardly from the piston through a slot 14 formed in the under portion of the cylinder longitudinally thereof. This slot and a similar slot 15 formed in the upper portion of the cylinder are sealed by upper and lower portions of the piston, thus preventing escape of air from the cylinder during sliding of the piston. The lower end of the stem 11 is secured to the inner end of the drag rod 16 leading from the king pin of the front or rear guiding wheels of the vehicle, and it will be readily understood that when the piston is slid longitudinally in the cylinder to shift the drag rod longitudinally, the guiding wheels will be turned to guide the vehicle toward the right or left according to the direction in which the piston is moved.

Movement of the piston is controlled through the medium of a slide valve 17 having a base 18 secured upon a platform or bracket 19 carried by and projecting outwardly from the chassis bar 2. The dome-shaped body or cover 20 of the valve is supported upon the base as shown in Figures 3 and 4 and is formed with bosses 21 having threaded bores 22 in one of which the supply pipe 23 leading from a source of compressed air is secured. The other boss has its bore closed by a plug 24, the two bosses being provided for convenience when installing the brake apparatus upon the automobile. Inlet ports 25 and 26 are formed through the bottom or base 18 to receive ends of the tubes 9 and 10 and between these ports is formed an outlet port 27 in the lower end of which is mounted a choke fitting 28. The upper portion of the port 27 is enlarged as shown at 29 and registers with the cavity 30 formed in the under face of the valve block 31 housed in the body 20 and slidably resting upon the base 18. This block 31 carries upstanding ears 32 constituting bearings for a pin or shaft 33 carrying spacer sleeves 34 between which engage the forks 35 of an arm 36 carried by a rocker shaft 37. This rocker shaft is rotatably mounted transversely through the valve body or cover with one end mounted in a cap bearing 38 and its other end protruding from the outer side wall of the cover and carrying a crank arm 39 which projects upwardly therefrom. When the rocker shaft is turned swinging movement is imparted to the arm 36 and the valve block 31 will be slid in a predetermined direction to uncover one of the ports 25 or 26 and establish communication between the other inlet port and the outlet port 27. If port 25 is uncovered, air will flow through tube 9 into the front end of the cylinder to shift the piston rearwardly and exert pull upon the drag rod 16 and during this movement of the piston, air in the rear portion of the cylinder will be forced out of the cylinder through tube 10 and out through the port 26, valve cavity 30 and outlet port 27. The check fitting 28 prevents too rapid escape of air from the port 27 and thus causes a smooth steering action to take place.

The steering shaft 40 is rotatably mounted in a bearing 41 carried by the cross bar 42 of the chassis and at its upper end the steering shaft carries the usual steering wheel 43. A worm 44 is provided adjacent the lower end of the steering shaft and meshes with a segmental gear 45 carried by a shaft 46 rotatably mounted through a bearing bracket 47 projecting rearwardly from the cross bar 42 and also journaled through the chassis bar 2. A lever arm 48 fixed to the outer end of the shaft 46 extends upwardly therefrom and at its upper end is pivoted to a union link 49. This link extends forwardly from the lever arm but is bent in spaced relation to its ends, as shown in Figure 2, so that its front end portion extends forwardly outwardly of the slide valve. The front end of the link is pivoted to the upper end of a combination lever 50 which has its lower end pivoted to the front end of a union link 51, the rear end of which is pivoted to the outer end of an arm 52 carried by and extending outwardly from the piston stem 11 with its outer portion extending downwardly and twisted for good pivotal connection with the rear end of the link 51. The upper end of the crank arm 39 is pivoted to the upper portion of the lever 50 in downwardly spaced relation to the link 49 and when the lever 50 is moved, turning movement is imparted to the shaft 37 through the medium of the crank arm 39.

The operation of the steering gear is as follows.

As the steering wheel 43 is turned to the left rotary motion is imparted to the shaft 46 to swing the lever arm 48 rearwardly and pull is exerted upon the link 49 to pull the upper end of the combination lever 50 rearwardly. As the lever 50 moves rearwardly, the crank arm 39 is swung rearwardly to turn the shaft 37 in a clockwise direction and as the shaft is turned in this direction, the arm 36 carried by the shaft within the valve body or casing is swung forwardly. This causes the valve block 31 to be shifted forwardly and the cavity 30 establishes communication between the port 25 and the exhaust port 27. Air in the valve flows through tube 10 into the rear end of the cylinder to shift the piston forwardly and air in the forward portion of the cylinder is exhausted through tube 9 and ports 25 and 27 and flows out through the choke fitting 28. This flow of air causes the piston to be moved forwardly and the piston stem 11 exerts forward thrust upon the drag rod 16 and since the drag rod is connected to the king pin of the guiding wheels of the vehicle, the guiding wheels will be turned toward the left and the vehicle guided in this direction. As the piston and the drag rod move forwardly, the union link 51 moves the lower end of the combination lever 50 forwardly. Forward thrust upon the lower end of the combination lever and rearward pull upon its upper end causes the combination lever to fulcrum at its pivotal connection with the upper end of the crank arm 39 until movement of the steering wheel ceases. The lever then fulcrums at the connecting rod and forward motion of the lever moves the valve block back to its centered or neutral position to close both ports 25 and 27 and stop flow of air and movement of the piston with the guiding wheels in position to direct the vehicle straight ahead. It will thus be seen that with this pneumatic steering apparatus, the vehicle may be easily and very smoothly turned and then driven straight ahead after the turn has been made. A similar operation takes place for a right hand turn except that the piston moves rearwardly instead of forwardly and exerts rearward pull upon the drag rod instead of forcing it forwardly.

Having thus described the invention, what is claimed is:

1. In a pneumatic steering gear, a cylinder, a piston slidable longitudinally in said cylinder, a stem extending from said piston out of said cylinder and having movement longitudinally of the cylinder with the piston, a drag rod having one end pivoted to said piston stem, a slide valve casing, tubes leading from front and rear ends of said cylinder to the valve casing and communicating with bores formed in the bottom of the valve casing, at opposite sides of an exhaust port, a slide block in said valve casing shiftable from a position in blocking relation to both of the first ports to a position establishing communication between the exhaust port and one of the first ports, a rocker shaft journaled through said valve casing and having an arm formed with a forked end engaging said slide block to shift the block when the shaft is turned, a crank carried by the outer end of said rocker shaft, a rotatable steering shaft, a driven shaft rotatably mounted transversely of the steering shaft, a worm carried by said steering shaft, a worm gear carried by said driven shaft and meshing with said gear, a lever arm rising from the other end of said driven shaft, a link extending forwardly from said lever arm and having its rear end pivoted to the lever arm, a combination lever pivoted at its upper end to the front end of the link, said crank having its upper end pivoted to the combination lever in spaced relation to the upper end thereof, a side arm projecting laterally from said piston stem, and a link having its rear end pivoted to the side arm and its front end pivoted to the lower end of the combination lever.

2. In a pneumatic steering gear, a rotatable steering shaft, a driven shaft rotatably mounted transversely of the steering shaft, means for transmitting rotary motion from the steering shaft to the driven shaft, a lever arm carried by said driven shaft, a cylinder having a longitudinally extending slot intermediate its length, a piston in said cylinder having end heads and an intermediate block, a stem secured through the intermediate block and projecting outwardly through the slot, a drag rod pivoted at one end to the outer end of said stem, a slide valve having a casing having an exhaust port, a choke for the exhaust port, tubes leading from said valve casing to opposite ends of said cylinder, a slide block in said casing for controlling communication between the exhaust ports and said tubes, a block actuator including a rocker shaft journaled in the valve casing with one end protruding therefrom, a crank carried by the outer end of said rocker shaft, a combination lever having said crank pivoted thereto in spaced relation to the upper end of the combination lever, a link connecting the upper end of said combination lever with the lever arm carried by the driven shaft, and a link connecting the lower end of the combination lever with said piston stem.

3. In combination with an automobile chassis having a chassis bar and a cross bar, a rotatable steering shaft rising from the cross bar, a driven shaft rotatably mounted longitudinally of the cross bar and projecting outwardly through the chassis bar, means for transmitting rotary motion from the steering shaft to the driven shaft, a cylinder extending longitudinally of the chassis bar and mounted outwardly therefrom, a piston slidable longitudinally in said cylinder, a stem for said piston extending out of said cylinder through a slot formed longitudinally therein, a support carried by said chassis bar and projecting outwardly therefrom, a slide valve mounted on said support, tubes connecting said valve with front and rear ends of said cylinder, actuating means for said slide valve including a rocker shaft having a crank projecting upwardly therefrom, a lever arm extending upwardly from the driven shaft, a link connected at its rear end to the upper end of the lever arm, a combination lever pivoted at its upper end to the front end of said link, said crank arm having its upper end pivoted to the combination lever in spaced relation to the upper end thereof, a link having its ends pivoted to the lower ends of the combination lever and the piston stem, and a drag rod pivoted at one end to the piston stem.

4. In combination with a vehicle chassis including a chassis bar, a cylinder extending longitudinally of the chassis bar and supported therefrom, a piston slidable in said cylinder, a driven shaft rotatably mounted transversely of the chassis, a steering shaft geared to the driven shaft for rotating the driven shaft when the steering shaft is turned, a slide valve having a casing provided with an exhaust port and tubes leading to front and rear ends of said cylinder, a slide block in said casing, a rocker shaft having an arm engaging said block for shifting the block to adjusted positions when the rocker shaft is rotated, a crank for said rocker shaft, a lever arm carried by said driven shaft, links pivoted at their rear ends to said lever arm and said piston, and a combination lever pivoted at its ends to front ends of said links and in spaced relation to its upper end pivoted to said crank.

5. In combination with a vehicle chassis, a pneumatic steering gear comprising a steering shaft and a driven shaft rotated therefrom, a cylinder extending longitudinally of said chassis, a piston slidable in said cylinder and having a stem projecting therefrom, a valve having an exhaust port and tubes leading to ends of said cylinder, adjusting means for said valve including a rocker shaft and a crank carried thereby, a lever arm extending upwardly from said driven shaft, links pivoted at their rear ends to the lever arm and the piston stem, and a combination lever pivoted at its top and bottom to front ends of said links and intermediate its length to said crank.

GEORGE R. MALONEY.
GEORGE R. PEARRE.